(No Model.)
W. L. VAN HORN.
COMBINATION REEL AND SPRINKLER.
No. 520,815. Patented June 5, 1894.
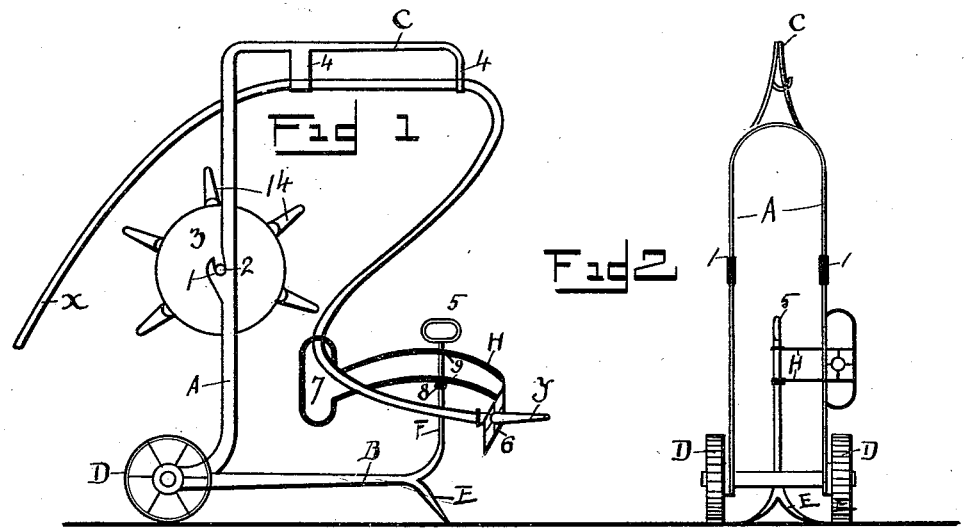
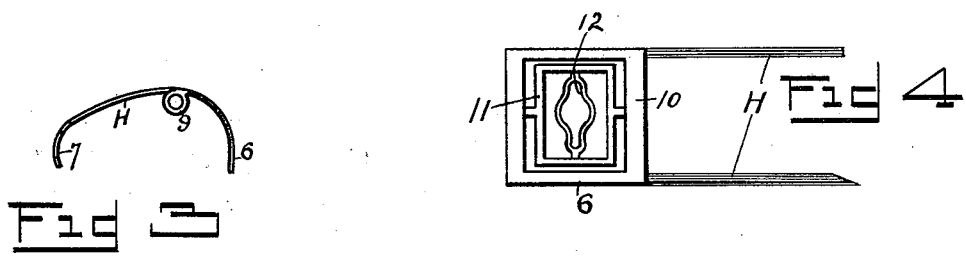
WITNESSES:
M. J. Schmit
D. C. Miller
INVENTOR:
William L. Van Horn
BY
ATTORNEY

UNITED STATES PATENT OFFICE.

WILLIAM LEE VAN HORN, OF NORFOLK, NEBRASKA.

COMBINATION REEL AND SPRINKLER.

SPECIFICATION forming part of Letters Patent No. 520,815, dated June 5, 1894.

Application filed September 28, 1893. Serial No. 486,754. (No model.)

*To all whom it may concern:*

Be it known that I, WILLIAM LEE VAN HORN, of Norfolk, in the county of Madison and State of Nebraska, have invented certain useful Improvements in a Combination Reel and Sprinkler; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in a combination reel and sprinkler.

The object of my invention is to provide a simple device that shall be readily operated and combine the advantages of a reel and sprinkler.

In the accompanying drawings Figure 1 shows the side elevation of a lawn sprinkler, embodying my invention. Fig. 2 is the rear view thereof with the reel and hose attached. Fig. 3 is a top view of the revolving nozzle-holder, while Fig. 4 shows a front view of a nozzle clamp as used in my device.

A represents a suitable supporting frame (preferably of strap iron), which is provided with the forward extending portion B and the upper hanger C, as shown in drawings. This standard, A, is preferably made of strap metal and is provided with the supporting wheels D and the forward supporting legs E. The upwardly extending portions, A, are provided at a suitable point with the ears 1, which are adapted to form a seating for the shaft 2 of the reel 3. This reel is removably held within the seating and is adapted to be detached when the device is used as a sprinkler. The upwardly extending arm C is provided with the hangers 4 4, preferably forming the part of this arm, and are adapted to give support to the hose, which is an ordinary garden hose provided with the usual nozzle $y$. Below the forwardly extending arm B is provided with an upwardly extending rod F, terminating in the handle 5, which is provided with the revolving nozzle holder H, which is preferably a frame of wire provided in front with the nozzle holder 6 and in the rear with the hose loop 7. At a suitable point the standard F is provided with a supporting holder H, as shown in Fig. 1. The holder H is provided with suitable loops, forming an eye encompassing the leg F, as shown in Figs. 1 and 3. In front I have provided the nozzle holder with the plate 10, within which is pivotally supported the frame 11, and within this frame 11 I have supported the spring nozzle holder 12 proper. This holder 12 is preferably made of wire and is pivoted at right angles to the frame 11 so as to have a universal joint.

The reel 3 is as ordinarily constructed and is provided with the operating handles 14. Upon this reel the hose is supposed to be rolled and held when the device is not used as a sprinkler. When the improvement is to be used for the purposes of a sprinkler the reel 3 is removed and the hose is carried between the bifurcated standard A and given support within the hangers 4 4. From these hangers the hose is curved downward and made to pass through the loop 7 of the revolving nozzle holder H, the nozzle $y$ of the hose being forced through the spring holder 12, which securely holds the nozzle, as shown in Fig. 1. The water is then turned on and permitted to escape out of the nozzle. Now as this nozzle is held within the movable holder, 12, (which is part of the revolving frame, 8, and operates as a pivoted arm) the water which escapes therefrom with force carries this arm in a circular path by virtue of the impact of the water with the air, the holder, H, being revolved precisely as are the so called pyrotechnic pin-wheels. If the hose were rigid it would, of course, be impossible to revolve the same, but being pliable the hose readily adjusts itself to the change of position so that it is carried up by the revolving nozzle. The loop 7 regularly permits the hose to accommodate itself in revolving as does also the universal nozzle support 12, so that the nozzle $y$ proper is swiftly carried about in a circle as long as the water is permitted to escape.

The device is noticeable because of its extreme simplicity, and,

Having thus described my said invention, what I claim as new, and desire to secure by United States Letters Patent, is—

1. In a hose reel and sprinkler, the combination with a suitable supporting standard provided with an upwardly extending stem, of a revolving nozzle holder mounted upon said stem and adapted to removably hold the nozzle of a suitable garden hose, and an upwardly extending standard adapted to give support to said garden hose, all arranged substantially as and for the purpose set forth.

2. In a hose reel and garden sprinkler, the combination of a suitable supporting standard provided with an upwardly extending stem, a revolving nozzle holder mounted upon said stem, an upwardly extending standard provided with a suitable arm in combination with a detachable reel hose removably held within said standard, all arranged substantially as and for the purpose set forth.

3. In a hose reel and garden sprinkler, the combination with a suitable supporting standard of an upwardly extending stem and revolving nozzle holder mounted upon said stem and provided with a removable holder at one end, and a loop at the other, a suitable hose reel adapted to be removably held within said standard, and an upwardly extending handle, all arranged substantially as and for the purpose set forth.

4. In a hose reel and garden sprinkler, the combination of the standard, A, provided with the upwardly extending portion B, of the upper hanger, C, the ears, 1, secured to said standard, A, adapted to detachably hold the reel, 3, the upwardly extending rod, F, terminating in the handle, 5, and provided with the curved nozzle holder, H, having the movable holder, 6, and the loop, 7, all adapted to hold and revolve a suitable garden hose, substantially as set forth.

5. In a hose reel and garden sprinkler, the combination of the standard A provided with the forwardly extending portion B and an outwardly extending arm C of the stem F, adapted to give support to the revolving nozzle holder H, said holder H being provided with the nozzle holder, comprising a frame 10 and swinging frame 11 and a pivoted spring holder 12, and being further provided with the loop 7, in combination with a detachable reel 3, all substantially as and for the purpose set forth.

In testimony whereof I affix my signature in presence of two witnesses.

WILLIAM LEE VAN HORN.

Witnesses:
 EDWARD E. HARTER,
 M. YEUNT.